US012631502B2

(12) United States Patent
Ortiz et al.

(10) Patent No.: US 12,631,502 B2
(45) Date of Patent: May 19, 2026

(54) PORTABLE AUTOMATIC TEMPERATURE SENSOR MULTI-TESTING DEVICE

(71) Applicants: Ismael A. Ortiz, North Lauderdale, FL (US); Leonardo S. Pereira, Deerfield Beach, FL (US)

(72) Inventors: Ismael A. Ortiz, North Lauderdale, FL (US); Leonardo S. Pereira, Deerfield Beach, FL (US)

( * ) Notice: Subject to any disclaimer, the term of this patent is extended or adjusted under 35 U.S.C. 154(b) by 318 days.

(21) Appl. No.: 18/380,816

(22) Filed: Oct. 17, 2023

(65) Prior Publication Data

US 2025/0123159 A1 Apr. 17, 2025

(51) Int. Cl.
*G01K 15/00* (2006.01)

(52) U.S. Cl.
CPC .................................. *G01K 15/007* (2013.01)

(58) Field of Classification Search
CPC .............................. G01K 15/007; G01K 1/026
See application file for complete search history.

(56) References Cited

U.S. PATENT DOCUMENTS

| | | | | |
|---|---|---|---|---|
| 5,803,603 | A * | 9/1998 | Schlueter | ............. G01K 15/007 236/94 |
| 7,561,058 | B2 * | 7/2009 | Farley | .................... H05B 3/746 374/1 |
| 8,600,693 | B1 * | 12/2013 | Kennamer | ............. G01K 1/024 374/1 |
| 2022/0134116 | A1 * | 5/2022 | Fried | .................... A61N 1/3787 607/116 |

* cited by examiner

*Primary Examiner* — John E Breene
*Assistant Examiner* — Manuel Salvador Castellon, Jr.
(74) *Attorney, Agent, or Firm* — DP IP GROUP; Franco S. De Liguori

(57) ABSTRACT

The present invention provides a portable automatic temperature sensor multi-testing device. The device has connectors for fast and easy connectivity of multiple temperature sensors of the same type to be tested, and a multi-selection switch for selecting the type of sensor to be tested and for automatically matching the tester's internal resistance to the internal resistance of the temperature sensor to be tester. An indication of the sensed temperature is displayed, or an indication that the corresponding sensor is detached, short-circuited, or broken down. The device facilitates simultaneous testing of multiple temperature sensors of the same type.

19 Claims, 5 Drawing Sheets

PORTABLE AUTOMATIC TEMPERATURE SENSOR MULTI-TESTING DEVICE

BACKGROUND

Field

The present invention relates to a temperature sensor testing apparatus, and particularly to a portable automatic temperature sensor multi-testing device that improves the efficiency of temperature sensor testing.

Background

Temperature sensors are widely used in industry, shipping and domestic systems for measuring the temperature of a device part or of a product, controlling a process and in general for accurately measuring temperature. In older times analogue thermometers were used which were designed as mercury-filled or alcohol-filled tubes.

With the advancement of electronics, digital thermometers were introduced offering, in general, high accuracy and higher speed of response. Two main types of digital thermometers exist: radiation (i.e., contactless infrared sensors) and resistance (i.e. a thermistor, which is an electrical resistor whose resistance is greatly reduced by heating).

Thermistors are mostly used in electronic apparatuses both for measuring temperature like a temperature gauge, but more importantly as part of electronic control systems which use temperature readings for performing a function, such as controlling processes, etc.

As with every sensor, thermistors may be damaged or influenced by harsh environments in which they may be installed, such as in a commercial ship or a factory. For this reason, it is imperative that temperature sensors are regularly tested. Removal of the sensor for testing at a lab is not convenient as it may not be easily accessible, and because it increases downtime and costs. For this reason, sensors that are already in use are preferably tested on-site using portable testers.

The simplest and by far the most versatile portable tester is an analogue or a digital multimeter. This instrument is widely used by technicians to test any electronic circuit or component, and in the case of a thermistor they can be used to measure resistance, voltage and current. However, in order to be able to use such an instrument, its user must match the selectable resistance of his meter with the resistance of the thermistor, which depends on the particular model and make of the thermistor. This means that a technician would have to check on the thermistor's model, identify in its manual, or in a related website, the nominal (internal) resistance of the thermistor and then adjust the resistance of his instrument.

This is obviously a cumbersome testing routine and one that is time consuming and costly. This is especially true for testing many sets of sensors, a scenario that is very common in practice, since many electronic systems contain several temperature sensors to survey and control their various parts, while critical systems often have backup sensors, connected in parallel, so as to limit erroneous readings and downtime.

In all these cases, more specialized testing equipment is preferable, and various such products exist in the market. Such testers are most times based on electronic devices that have a microprocessor or an entire computing device which allow the simplification of the testing process, while being suitable to connect many sensors at once by the use of specialized sensor racks or plug-in positions. The microprocessor of such a tester may be programmed to test one sensor after the other in an automated manner and all the user has to do is to program the resistance of each sensor he connects to each input of the tester. This scenario may be used on-site but it is most suitable for lab or manufacturing line testing as it can support large numbers of sensors and it needs programming prior to testing a set of sensors. On top of that, these programmable testers are rather expensive or very expensive and most times are also bulky, complex and heavy, rendering them unsuitable for field use.

To cater for the needs of field use, specialized portable testers are on sale, which are smaller, simpler in design and manufacture, and lighter and can be used to test one or more sensors. When testing one sensor at a time, testing times are rather long as their user has to connect and disconnect one sensor after the other. Some have multiple connectors so that more than one sensor can be connected to the tester. Even in this case, the tester tests one sensor after the other in a serial fashion. So, again it is time consuming to test sensors.

In some portable testers the user can operate a switch to select which connected thermistor he wants to test. In this case he has to manually match the resistance of the tester to the resistance of the thermistor under test. This is a tedious procedure, which adds complexity to the testing routine, as the user has to consult the thermistor's manual or some other information source. Such a routine may not be suitable for an inexperienced human tester (i.e., the human user of such a testing device or apparatus) or for a human tester with no technical skills. This feature of the tester renders it cumbersome to use, adds complexity and does not provide a better tester device.

Furthermore, prior art temperature sensor testers, and sensor testers in general, specialize in one mode of testing operation, namely current leakage (e.g. due to sensor or sensor cable degradation due to use in harsh environments), work/not-work (e.g. is the sensor operational or is it out of order—can be easily checked with a multimeter), and actual testing of temperature readings (i.e., check if the temperature readings provided by the sensor are correct and do not deviate significantly from the actual temperature to be measured as a result of the temperature sensor malfunctioning. No known temperature sensor provides all these modes of operation and especially does not provide them automatically, i.e., without requiring an operator to select a specific mode of operation. Neither is a sensor tester capable of providing these modes of operation for simultaneous testing of multiple sensors.

There is, therefore, a need for a portable automatic temperature sensor multi-testing device that overcomes the foregoing drawback in the conventional art.

SUMMARY

The present invention solves the problem of providing a portable automatic temperature sensor multi-testing device (hereinafter also "device") that is simple in construction, economic to manufacture, and can improve testing efficiency, while being adapted to the field use and require no special technical skills from its human operator.

The device has a plurality of connectors for fast and easy connectivity of multiple temperature sensors of the same type to be tested, while providing reliable electromechanical connection and avoiding current leakages that could affect testing accuracy. Once the temperature sensors are plugged in, the user selects the type of sensors to be tested using a multi-selection switch. The switch translates the user's sensor type selection into matching the tester's internal resistance to the internal resistance of the temperature sensors. This is achieved by selecting a resistor in the tester for each connected temperature sensor and building a closed circuit connecting in series the selected resistor of the tester with the temperature sensor. As a result, the same value or tester internal resistor is selected for each temperature sensor.

Each closed circuit thereby formed is fed with power from a voltage source comprised in the tester and is also connected to an electronic thermometer and a digital temperature display. The electronic thermometer is implemented as an Ampere meter and a current comparator, or as a voltage meter and a voltage comparator and outputs a temperature value corresponding to the temperature sensed by the respective temperature sensor that is then displayed.

In another exemplary embodiment, the electronic thermometer is configured to detect if the corresponding temperature sensor connected to it is disconnected, broken-down, or short circuited and a corresponding code is then displayed.

The power source is a battery, while in other exemplary embodiments a rechargeable battery is connected to a power charger, which is in turn connected to a charging port.

DETAILED DESCRIPTION

The word "embodiment" described herein as "exemplary" is not necessarily to be construed as preferred or advantageous over other embodiments.

The term "exemplary" is used herein to mean "serving as an example, instance, or illustration".

The acronym "ASIC" is intended to mean "Application-Specific Integrated Circuit".

The acronym "CD" is intended to mean "Compact Disc".

The acronym "DSL" is intended to mean "Digital Subscriber Line".

The acronym "DVD" is intended to mean "Digital Versatile Disc".

The acronym "THRES" and "THRESH" are intended to mean "Threshold".

The term "tester", when used alone and without any further characterization, may be used interchangeably with "tester device", "portable tester device", "tester apparatus", and "portable tester apparatus".

The term "user" may be used interchangeably with "regular user", "ordinary user", and "human tester". It may also be used to mean "user of an application" or "user of a service". It may also be used to refer to a "technician", or to an "operator", unless otherwise explicitly stated or implicitly hinted at in the description, or obvious to a reader of ordinary skill in related art that these terms refer to different things, as this is apparent by the context of the discussion in which they appear.

The term "system" may be used interchangeably with "device", "computing device", "apparatus", "computing apparatus", and "portable tester", except where it is obvious to a reader of ordinary skill in related art that these terms refer to different things, as this is apparent by the context of the discussion in which they appear. Under any circumstance, and unless otherwise explicitly stated or implicitly hinted at in the description, these six terms should be considered to have the broadest meaning i.e. that of encompassing all six.

The term "module" may be used interchangeably with "unit" or "subunit", except where it is obvious to a reader of ordinary skill in related art that these terms refer to different things, as this is apparent by the context of the discussion in which they appear.

The term "sensor" may be used interchangeably with "detector".

System Hardware Architecture

Figure 1:
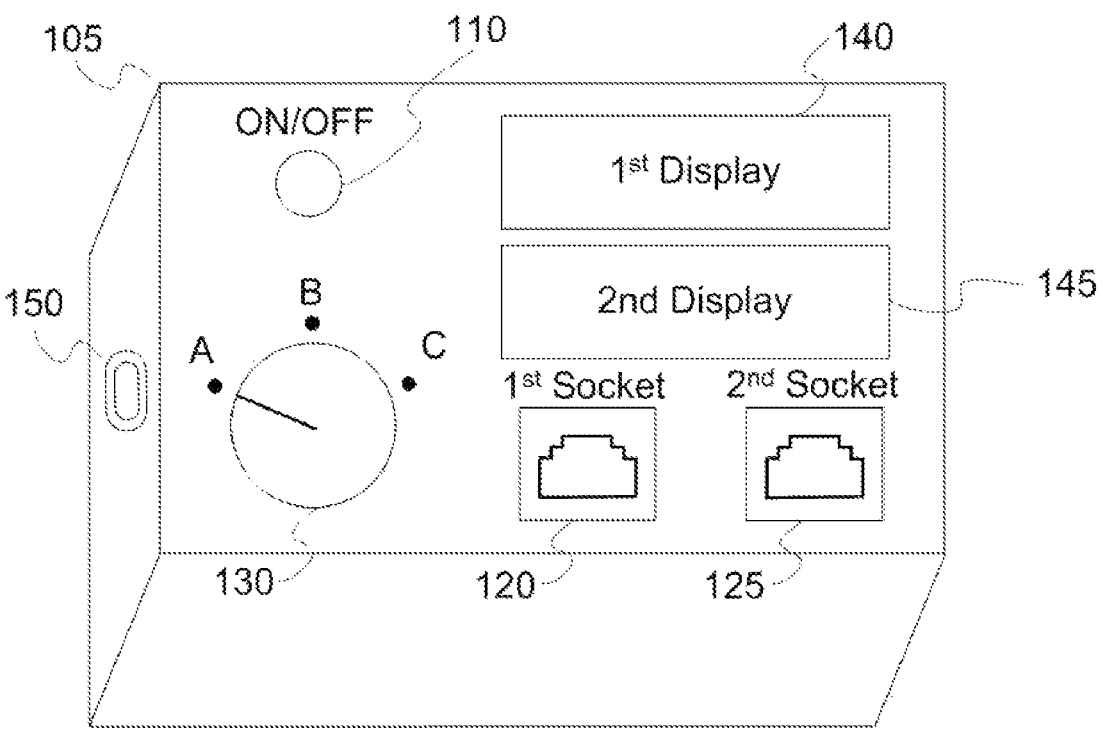
FIG. 1 shows a 3D perspective drawing of an exemplary implementation of the portable automatic temperature sensor multi-testing device according to an embodiment of the present invention.

FIG. 1 shows a 3D perspective drawing of an exemplary implementation of a portable automatic temperature sensor multi-testing device (hereinafter also "device," "tester," "sensor," and "detector"), generally designated with reference numeral (100), according to an embodiment of the present invention.

Tester (100) is in the general configuration of a box (105) carrying all the electronic and electromechanical components needed to implement the tester. Tester (100) may be manufactured using various materials including metal, alloys, plastics or any combination of these materials.

A preferred configuration for tester (100) is that of a 3-Dimensional (3D) box, but any other configuration and relative x, y, z dimensions may be selected. Any type of finishing (e.g., textured surfaces) may be selected, while corner and edge curvature and smoothness may be selected as desired. The box may be molded or integrated from individual components either by welding, gluing, snap-fitting, screwing, or similar means.

The foregoing configuration and construction for tester (100) are presented as examples only and by no means are intended to limit the scope of protection sought. Furthermore, these design characteristics do not influence the functionality of the tester (100) as long as the box (105) is sufficiently shaped and dimensioned to allow the secure and unobstructed fitting of all the components that will be presented below, as well as their unobstructed and no-influenced operation whatsoever, as this is obvious to any person of skill in related art.

Box (105) has at its upper (or at any other) surface an ON/OFF button (110) which can be implemented as, for example, a push button, a toggle switch, a turn knob, a touch button, or the like. Its function is to switch ON and OFF the tester (100) by electrically connecting and disconnecting, respectively, a power source with the electronic components of the tester (100) for providing sufficient operating power to the later.

Tester (100) also has one or more (for simplicity two are shown in the exemplary implementation of FIG. 1) temperature displays (140), (145) which are configured for displaying the temperature corresponding to the readings of corresponding temperatures sensors connected to the tester (100). Temperature displays (140), (145) may be implemented, for example as LED displays, or any other type of display capable of displaying alphanumeric characters, or equivalent symbols in alternative exemplary embodiments. Temperature displays (140), (145) can also display the state of the connected sensors (e.g., short circuit, or sensor not detected or connected, or sensor broken). These display messages and readings are provided by a digital multi-thermometer-type electronic circuit (please refer to FIG. 5).

A number of connector sockets (120), (125) is provided for enabling the user of the tester (100) to easily, fast and reliably connect the temperature sensors to be tested. In this way, accurate measurements can be obtained without bias from leakage currents, etc. influences. The number of connector sockets (120), (125) is equal to the number of temperature displays (140), (145); any number can be used, while FIG. 1 (and subsequent figures) shows only 2 for simplicity of explanation.

By means of example, the connector sockets (120), (125) are of the RJ11 type, which is widely used in industry, but any type of connector could be used upon which the respective cables (160) that are connected to the temperature sensors under test can be plugged e.g., with a matching RJ11 plug or via an RJ11 adaptor plug. This way any type of temperature wire socket could be used to connect the temperature sensor with tester (100).

In one exemplary implementation, connector sockets (120), (125) are all of the same type, while in alternative exemplary implementations different socket types may be used with or without adapter plugs.

Tester (100) also has a sensor type selector switch (130), which is intended to allow for easy and fast selection of the type of temperature sensor to be tested. In the present exemplary implementation, sensor type selector switch (130) is a three-position selector, as commonly used temperature sensors are of three types, which types each correspond to one of the following internal sensor resistances: 30K, 10K, 3K Ohms. This way, a user can select the type of temperature sensor to test (e.g., type A, B, C) without having to know that each type corresponds to a specific sensor resistance, or that the sensors under test do have an internal resistance that has to be matched by tester (100) in order for a meaningful test to be conducted. This way the device is suitable for use by any person, even those with no special technical skill. For example, this may be very useful in a pleasure boat, or in non-industrial, or domestic environments, where a technician may not always be available and where calling a technician may not be preferable due to the high costs involved, or not practical if the boat is sailing.

In the present exemplary implementation of tester (100), sensor type selector switch (130) is connected to electronics inside box (105), which are designed for the switch (130) to automatically connect at the same time all connector sockets (120), (125), and the respective temperature sensors that are connected to the sockets, with resistors of the same resistance. In other words, each of the connected sensors under test are connected via sensor type selector switch (130) to a resistor forming an identical electronic circuit with the other connected sensors. This way, testing of identical temperature sensors is made faster and cheaper, as well as, easier for persons of no technical skill. It is worth noting that, in alternative exemplary implementations, any number of sensors can be connected, up to a maximum equal to the number of connector sockets (120), (125) available in the exemplary implementation of tester (100) that is used.

Tester (100) may optionally have a charging socket (e.g., a Universal Synchronous Bus (USB) of any type, or any other type of socket) for allowing easy and fast charging of a rechargeable battery inside box (105). In an exemplary embodiment, the charging socket is connected to a battery charger module and the battery to be charged is a rechargeable battery.

In alternative exemplary implementations of tester (100), the number of temperature displays (140), (145), connector sockets (120), (125), and selectable positions of the sensor type selector switch (130) can be modified, as well as, their type, shape and dimensions, and relative-to each-other positions on the surfaces of box (105), without limiting or altering the scope of protection of the present invention.

In yet another exemplary implementation, the power source used is a battery and the tester has no charging socket and/or battery charger module.

First Use Scenario

Figure 2:
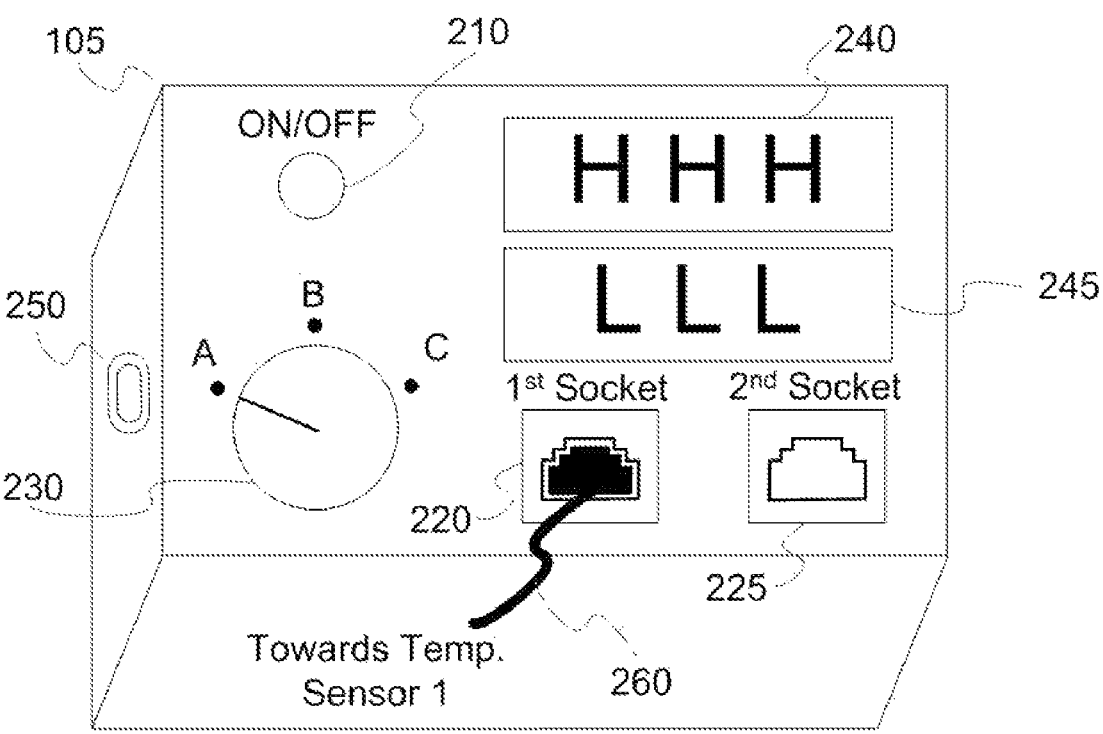
FIG. 2 shows the device of FIG. 1 in a first exemplary use scenario.

FIG. 2 shows the portable temperature sensor tester of FIG. 1 in a first exemplary use scenario. In this use scenario, a tester (200) is illustrated with two temperature displays (240), (245), connector sockets (220), (225) for simplicity, while other numbers of temperature displays (240), (250) and connector sockets (220), (225) may be used. Tester (200) also has a three-position sensor type selector switch (230) for simplicity, but other numbers of positions could be used instead. A user connects a first temperature sensor via cable and plug (260) to socket (220) and leaves socket (225) disconnected. The user then selects the type of sensor by engaging (i.e., turning, or switching) sensor type selector switch (230) to one of the predetermined positions. For example, the user selects a Type C sensor. By this construction, sensor type selector switch (230), upon engagement by the user, automatically connects each connector sockets (220), (225) to temperature displays (240), (245), via a resistor that matches the resistance of the selected "Type C" temperature sensor (e.g., 3K Ohm). The user simply selects the type of temperature sensor he has connected to tester (200) and wants to test without knowing or caring about the sensor's resistance and the fact that the sensor's resistance has to be matched by the selected tester (200) resistance, where each of the sensors and the testers selected resistors, battery (or other power source) and temperature display form a closed electrical circuit.

For the first electrical circuit, the first temperature sensor is connected via the first socket (220) to the first temperature display (240), which displays the state of the tested first temperature sensor. In this exemplary usage scenario, the first temperature sensor is short-circuited. This state (i.e., the short circuit) is detected by tester (200) by any known method.

Thereafter, the user switches tester (200) ON and the testing process begins.

Detecting a Short-Circuited Temperature Sensor

The short circuit may be detected, e.g., by detecting a current larger than a predetermined threshold flowing through the circuit as the total resistance of the circuit formed by the selected resistance of the tester (Rtester) and the resistance of the temperature sensor (Rshc) connected in series is higher than expected because (we assume that the selected sensor type has a 3K Ohms nominal internal resistance):

$$Rtotal = Rtester + Rshc + 3K + 0 = Rc$$

meaning that:

$$I = V/Rtotal = V/3K$$

which is higher than the expected, threshold current, Ithresh:

$$Ithresh = V/Rtotal = V/(3K + 3K) = V/6K$$

because:

$$I > Ithresh \rightarrow V/3K > V/6K$$

Alternatively in another exemplary implementation, tester (200) identifies the short circuit by identifying that the total resistance Rtotal of the circuit formed by the selected resistance of the tester (Rc) and the resistance of the temperature sensor (Rshc) connected in series is lower than the expected threshold Rthresh:

Rtotal<Rthresh because:

3K<6K

This could be detected by measuring the voltage across the total resistance of the short-circuited circuit and comparing it with the voltage across the expected threshold voltage (Vthresh) across the Rtotal of a circuit without a short-circuited temperature sensor. If the measured voltage (V) is below the threshold voltage Vthresh, then the short circuit is detected.

The detection of the short-circuited temperature sensor can be implemented either with an Ampere meter and a current comparator, or in alternative exemplary embodiments, with a voltage meter and a voltage comparator. The output of the comparison (for the first sensor), regardless of the comparison circuit used is connected to the first display (240), which triggers it to display a preset code for indicating the short circuit. Any such code may be used. By means of example, "HHH" is displayed as shown in FIG. 2, but any other code could equally be displayed without departing from the scope of protection of the present invention.

Detecting a Broken-Down, or an Undetectable, or Disconnected Temperature Sensor

No temperature sensor is connected to the second socket (225) in FIG. 2. This means that the resistance of the hypothetically connected temperature sensor is infinite:

Rsensor=∞

This, in practice means that Rsensor is very large, i.e., hundreds of times larger than the selected internal resistance Rtester of tester (200):

Rsensor>>Rtester

This can be detected similarly to the case described for a short-circuited temperature sensor by using an Ampere meter and a current comparator, or with a voltage meter and a voltage comparator to detect an open electrical circuit (i.e. a circuit with Rsensor=∞). In essence, the tester's comparator will detect that the total resistance of the circuit formed by the selected resistance of the tester (Rc) and the resistance of the temperature sensor (Rshc) connected in series is hundreds of times (or may magnitudes) larger that the threshold Rthresh:

$$Rthresh = Rsensor + Rc = \infty + 3K$$

The output of the comparison, regardless of the comparison circuit used is connected to the second display (245), which triggers it to display a preset code for indicating any of a disconnected, broken down or undetectable temperature sensor. Any such code may be used. By means of example, "LLL" is displayed as shown in FIG. 2, but any other code could equally be displayed without departing from the scope of protection of the present invention.

Second Use Scenario

Figure 3:
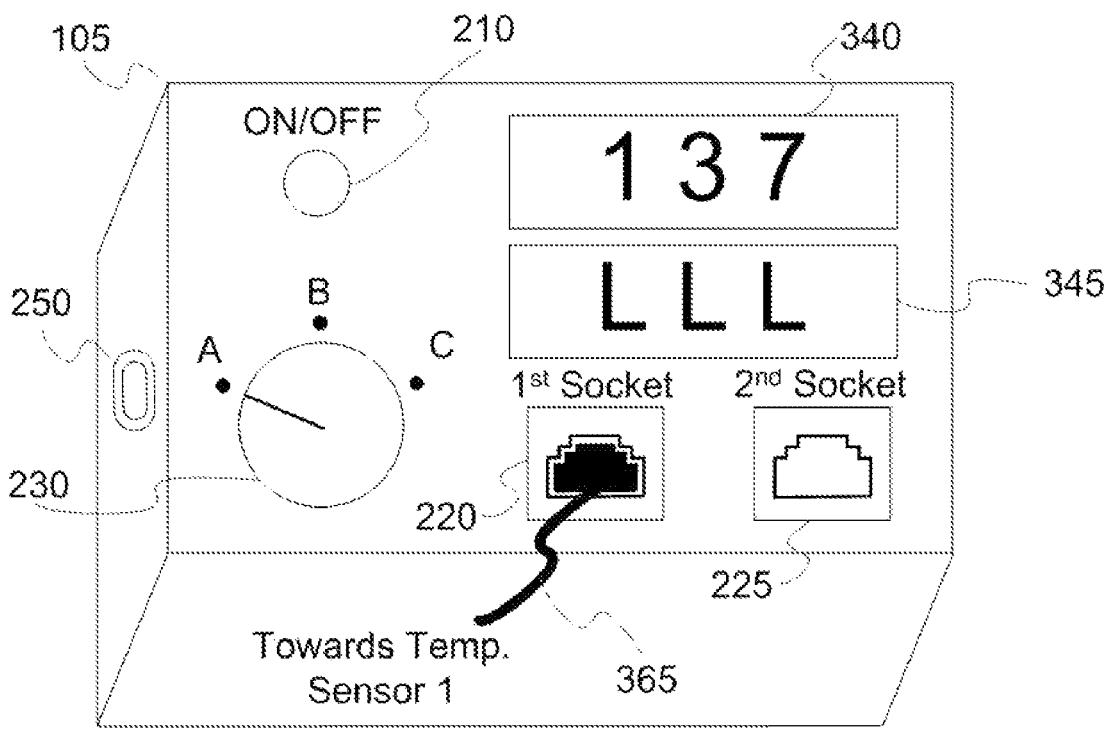
FIG. 3 shows the device of FIG. 1 in a second exemplary use scenario.

FIG. 3 shows the tester of FIG. 1 in a second exemplary use scenario.

Similarly to the first use scenario of FIG. 2, the second use scenario uses the same tester (200), with a first temperature sensor and cable (365) connected to the first socket (220), while no temperature sensor is connected to the second socket (225). The first socket (220) is connected to the first display (340) and the second socket (225) is connected to the second display (345).

Since no temperature sensor is connected to the second socket (225), the second display (345) displays the code "LLL" (or other similarly defined code) for indicating any of a disconnected, broken down or undetectable temperature sensor.

Measuring a Temperature Sensed by a Temperature Sensor

A first operating temperature sensor with a cable (365) is connected to the first socket (220) and forms a closed electrical circuit with the tester's internal resistor selected by the tester's sensor type selector switch (230), and the first temperature display (240). The temperature sensor's internal resistance is matched by the resistance of the selected "Type C" temperature sensor (e.g., 3K Ohm) of the tester.

The total resistance of the closed electrical circuit is compared with an expected threshold resistance Rthres, where $$Rthres = Rtester + Rsensor = 3K + 3K.$$

Any deviation from this value can be attributed to the temperature sensor's variable resistance as temperature is detected. In other words, for the selected type of temperature sensor (i.e., type A), Rsensor is 3K at a temperature of, say, 30° C. If the measured temperature is not 30° C., the Rsensor will be higher or lower than the expected 3K Ohms. So, knowing how Rsensor fluctuates as temperature rises and drops, a known curve or table can be used to calculate the temperature detected by the temperature sensor connected to the tester from the actual internal resistance of the temperature sensor.

The measurement of actual internal resistance of the temperature sensor can be done using an Ampere meter and a current comparator, or a voltage meter and a voltage comparator, as previously described for the first use scenario.

The output of the comparison, regardless of the comparison circuit used is connected to the first display (240), which triggers it to display a temperature measurement corresponding to the temperature sensed by the temperature sensor. Any measurement format may be used, such as Centigrade, Fahrenheit, Kelvin, etc.

Third Use Scenario

Figure 4:
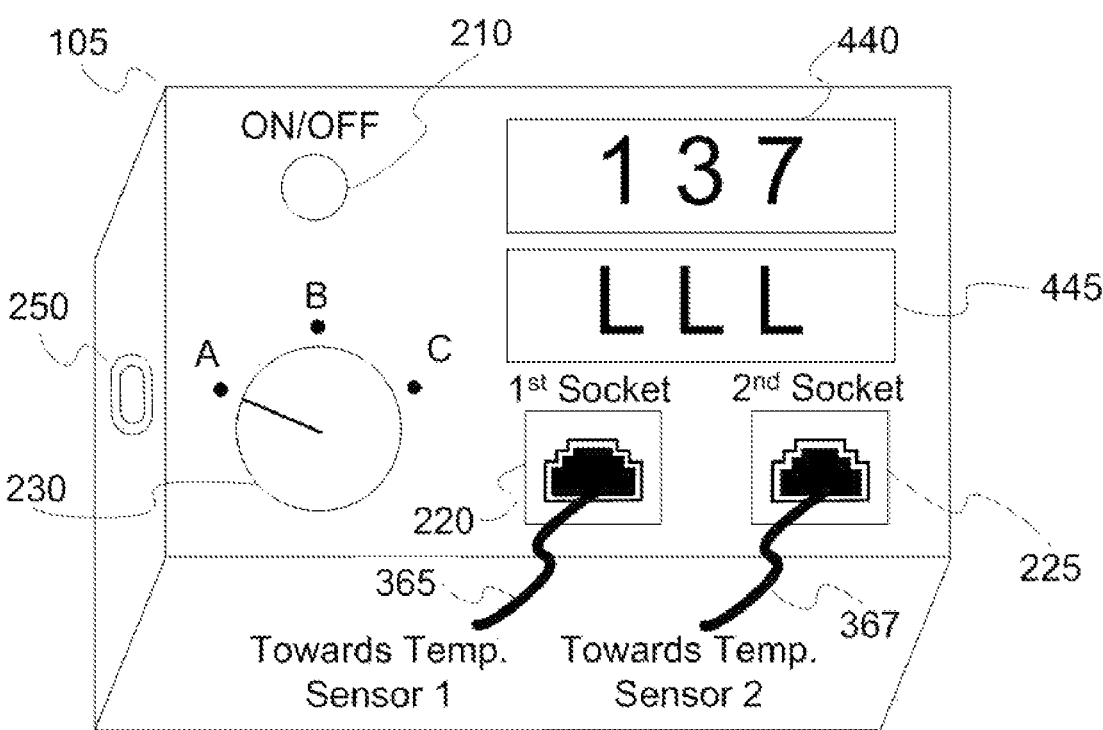
FIG. 4 shows the device of FIG. 1 in a third exemplary use scenario.

FIG. 4 shows the tester of FIG. 1 in a third exemplary use scenario.

Similarly to the first and second use scenarios of FIGS. 1-2, the third use scenario uses the same tester (200), with a first temperature sensor and cable (365) connected to the first socket (220), and a second temperature sensor and cable (367) connected to the second socket (225).

The first socket (220) is connected to the first display (340) and the second socket (225) is connected to the second display (345).

A first operating temperature sensor with a cable (365) connected to the first socket (220) and forms a closed electrical circuit with the tester's internal resistor selected by the tester's sensor type selector switch (230), and the first temperature display (240). The temperature sensor's internal resistance is matched by the resistance of the selected "Type A" temperature sensor (e.g., 3K Ohm) of the tester.

The total resistance of the closed electrical circuit is compared with an expected threshold resistance Rthres, where $$Rthres = Rtester + Rsensor = 3K + 3K.$$

Any deviation from this value can be attributed to the temperature sensor's variable resistance as temperature is detected. In other words, for the selected type of temperature sensor (i.e., type A), Rsensor is 3K at a temperature of, say, 30° C. If the measured temperature is not 30° C., the Rsensor will be higher or lower than the expected 3K Ohms. So, knowing how Rsensor fluctuates with temperature rise and drop a known curve or table can be used to calculate the temperature detected by the temperature sensor connected to the tester from the actual internal resistance of the temperature sensor.

The measurement of actual internal resistance of the temperature sensor can be done using an Ampere meter and a current comparator, or a voltage meter and a voltage comparator, previously described for the first use scenario.

The output of the comparison, regardless of the comparison circuit used is connected to the first display (240), which triggers it to display a temperature measurement corresponding to the temperature sensed by the temperature sensor. Any measurement format may be used, such as Centigrade, Fahrenheit, Kelvin, etc.

Similarly, a second operating temperature sensor with a cable (367) is connected to the second socket (225) and forms a closed electrical circuit with the tester's internal resistor selected by the tester's sensor type selector switch (230), and the second temperature display (245). The temperature sensor's internal resistance is matched by the resistance of the selected "Type A" temperature sensor (e.g., 3K Ohm) of the tester. It is noted that both internal resistors of the tester for matching the internal resistance of the first and second temperature sensors are identical, enabling the fast selection and testing of temperature sensors of the same type.

Temperature measurement and display of the second temperature sensors is identical to that described for the first temperature sensor.

Electronic Circuit

Figure 5:
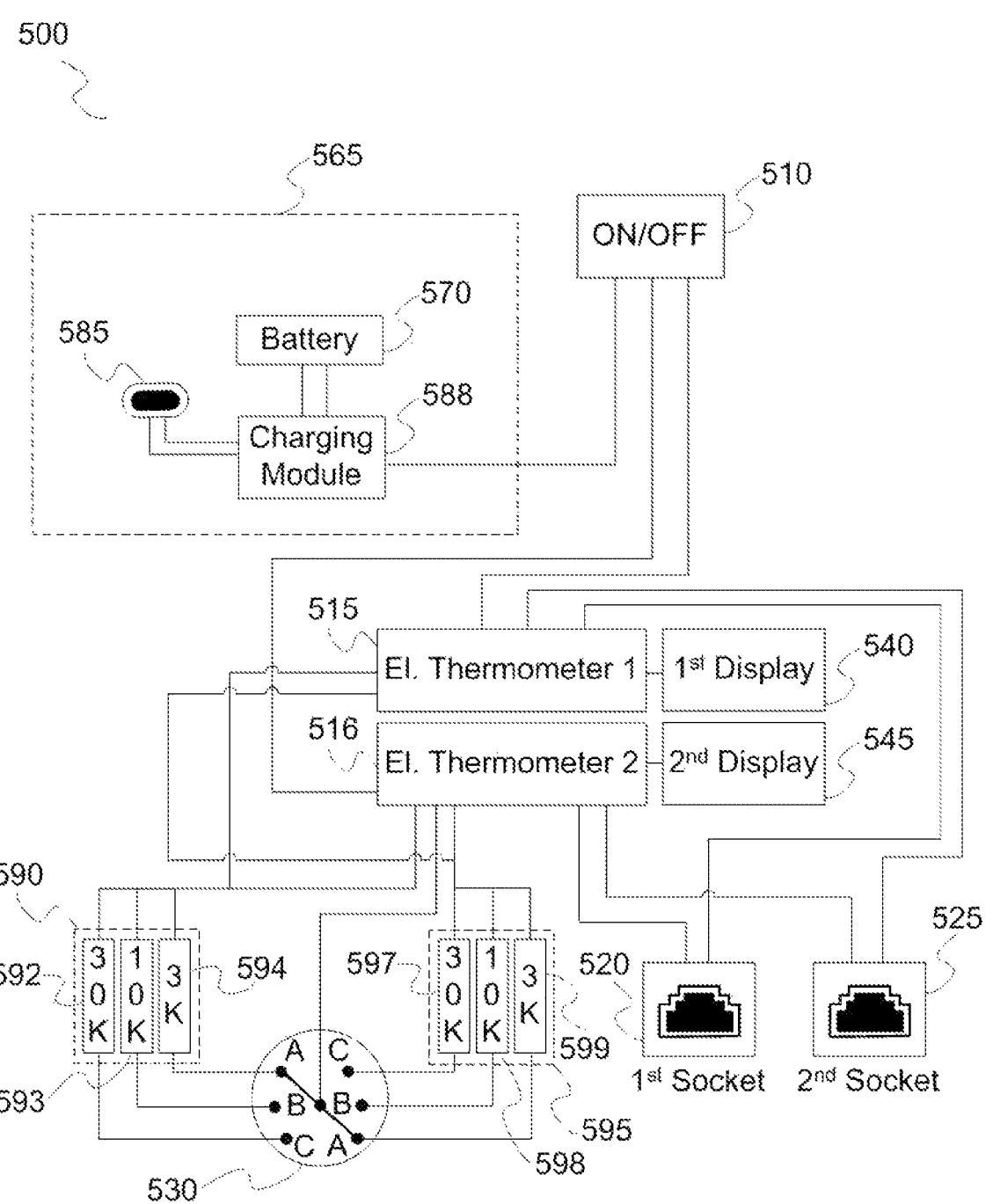
FIG. 5 shows an exemplary implementation of an electronic circuit implementing the device of FIG. 1.

FIG. 5 shows an exemplary implementation of an electronic circuit, generally designated with reference numeral 500, implementing the tester of FIG. 1.

The electronic circuit (500) of the present portable temperature sensor has a power supply module (565), which supplies power to the rest of the electronic components of the electronic circuit (500) via an ON/OFF switch (510). Power is supplied to a first electronic thermometer module (515) connected to a first (540) temperature display, i.e., a digital alphanumeric display or any digital display module.

The first electronic thermometer module (515) is implemented according to the principles for detecting a measured temperature signal from an operating temperature senor, or a short-circuited, or broken-down, or undetectable, or disconnected temperature sensor described in the previous use cases. In practice, it may take the form of an Ampere meter and one or more current comparator, or a voltage meter and one or more voltage comparator.

In one aspect, the first electronic thermometer module (515) and the first alphanumeric display are implemented as a single first digital thermometer control module. Similarly, a second electronic thermometer module (516) and the second alphanumeric display (545) are used for the second sensor, and the second electronic thermometer module (516) and the second alphanumeric display (545) can be implemented, in an alternative exemplary implementation, as a single second digital thermometer control module.

Power is distributed to the selected tester resistor for the first temperature sensor (590) and for the second temperature sensor (595), and to the first (520) and second (525) sockets, and consequently to the first and second temperature sensors thereby forming a first and a second closed electrical circuit.

The tester resistors that are available for the first (590) and the second (595) temperature sensors are of "A" (592), "B" (593), and "C" (594) type, and "A" (597), "B" (598), and "C" (599) type, respectively.

Identical tester resistors are selected for the first and the second temperature sensors that are tested together by the portable tester. So, the user of the tester selects with the tester's sensor type selector switch (530) between temperature sensor type "A", "B", or "C". Without the user knowing, sensor type selector switch (530) selects a resistor matching the internal resistor of the selected temperature sensor type "A", "B", or "C" by selecting two 30K (592), (597), or two 10K (593), (598), or two 3K (594), (599) resistors, respectively, for the first and the second temperature sensors.

Effectively, sensor type selector switch (530) performs a different, or an additional function to that performed by the user of the portable tester, i.e., a function that is not obvious to the user and allows users with no special technical skill to perform the testing of temperature sensors.

The innovative solutions according to the present invention may be implemented by any type of purpose build electronic device implementing the present innovative solution, or a general-purpose Integrated Circuit (IC), which runs special software that transforms it to an application-specific computing device adapted to implement the present innovative solutions.

The steps of the methodologies previously described are exemplary, and any person skilled in related art may add, remove, merge, or change the order of steps without departing from the scope of protection of the present invention.

The present innovative solution can be (partly) implemented by software written in any programming language, or in an abstract language (e.g., a metadata-based description which is then interpreted by a software or hardware component). The software running in the above-mentioned hardware, effectively transforms a general-purpose or a special-purpose hardware or computing device, apparatus or system into one that specifically implements the present innovative solution. In another aspect an embedded system is used.

Alternatively, the present innovative solution can be implemented in Application Specific Integrated Circuits (ASIC) or other hardware technology.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of preferred embodiments and best mode of the invention has been presented and is intended for the purposes of illustration and description. It is not intended to be exhaustive or limit the invention to the precise form disclosed and many modifications and variations are possible in the light of the above teachings. The embodiments were chosen and described to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

What is claimed is:

1. A portable apparatus for more efficiently testing temperature sensors, the apparatus comprising:

a plurality of connector sockets configured for electromechanically connecting a plurality of temperature sensors to be tested, the plurality of connector sockets being of the same type and compatible with RJ11 connectors, and configured for connecting a plurality of temperature sensors of the same type;

a power source;

an ON/OFF switch connected to the power source;

a plurality of resistor sets, wherein each resistor set comprises a number of resistors of the same value, wherein the number of resistors is equal to the plurality of connector sockets;

a temperature sensor multiple selection switch; and a plurality of digital thermometer control modules, each connected to the ON/OFF switch and configured for receiving power from the power source, and comprising a temperature display and an electronic thermometer module connected to the temperature display, wherein the plurality of the digital thermometer control modules is equal in number to the number of resistors in any of the plurality of the resistor sets;

wherein the apparatus is configured for (a) allowing a user to switch the temperature sensor multiple selection switch for selecting a type of temperature sensor, wherein upon selecting the type of temperature sensor, the temperature sensor multiple selection switch is configured for (b) connecting a first end of each resistor in one of the plurality of resistor sets with one of the plurality of temperature sensors via one of the plurality of connector sockets, and a second end of each resistor in one of the plurality of resistor sets with one of the plurality of the electronic thermometer modules, thereby matching a resistance of each resistor in the selected of the plurality of resistor sets with a resistance of the plurality of temperature sensors without the user having to select a resistance value, and (c) displaying at each of the plurality of temperature displays a value corresponding to a temperature sensed by one of the plurality of corresponding temperature sensors.

2. The portable apparatus of claim 1, wherein the plurality of temperature displays is also configured for displaying that a corresponding temperature sensor is one of disconnected, short-circuited, broken down, and undetectable.

3. The portable apparatus of claim 1, wherein the power source comprises one of:

a battery; and a rechargeable battery connected to a battery charger module.

4. The portable apparatus of claim 3, wherein the battery charger module also comprises a charging socket.

5. A portable apparatus for testing temperature sensors, the apparatus comprising:

a plurality of connector sockets configured for electromechanically connecting a plurality of temperature sensors to be tested, the plurality of connector sockets being of the same type and compatible with RJ11 connectors, and configured for connecting a plurality of temperature sensors of the same type; a power source; an ON/OFF switch connected to the power source; a temperature sensor multiple selection switch; and a plurality of digital thermometer control modules each comprising a temperature display and an electronic thermometer module connected to the temperature display, and configured for receiving power from the power source via the ON/OFF switch; wherein the apparatus is configured such that upon selecting a type of temperature sensor using the temperature sensor multiple selection switch, each of the plurality of temperature sensors is operably connected through one of the plurality of connector sockets to one of the plurality of the digital thermometer control modules, and each temperature display is configured to display a value corresponding to a temperature sensed by a corresponding temperature sensor.

6. The portable apparatus of claim 5, further comprising a plurality of resistor sets, each resistor set comprising a number of resistors of the same value equal to the number of connector sockets, wherein the temperature sensor multiple selection switch is further configured to connect a first end of each resistor in one of the resistor sets with one of the plurality of temperature sensors and a second end with one of the plurality of the electronic thermometer modules, thereby matching a resistance of each resistor in the selected resistor set with a resistance of the plurality of temperature sensors without requiring manual selection of a resistance value.

7. The portable apparatus of claim 5, wherein the plurality of temperature displays is further configured for displaying that a corresponding temperature sensor is one of disconnected, short-circuited, broken down, or undetectable.

8. The portable apparatus of claim 5, wherein the power source comprises one of: a battery; or a rechargeable battery connected to a battery charger module.

9. The portable apparatus of claim 8, wherein the battery charger module further comprises a charging socket.

10. The portable apparatus of claim 5, wherein the plurality of the digital thermometer control modules is equal in number to the number of resistors in any of the resistor sets.

11. A portable apparatus for testing temperature sensors, comprising:

a housing configured to enclose electronic and electro-mechanical components;

a plurality of connector sockets configured to receive respective temperature sensors to be tested;

a plurality of temperature displays, each display corresponding to one of the connector sockets and configured to display temperature readings or diagnostic information related to the connected temperature sensor;

a sensor type selector switch operatively connected to the connector sockets and configured to select a resistance profile for testing a selected type of temperature sensor from a plurality of sensor types; and a power source configured to provide operating power to the apparatus, and an ON/OFF switch for selectively connecting the power source to the electronic components wherein the connector sockets are of the same type and compatible with RJ11 connectors.

12. The apparatus of claim 11, wherein the sensor type selector switch is configured to simultaneously connect each of the plurality of connector sockets to a respective resistor of a resistance corresponding to the selected sensor type.

13. The apparatus of claim 11, wherein the sensor type selector switch includes at least three selectable positions, each corresponding to a temperature sensor having a different internal resistance.

14. The apparatus of claim 11, wherein the temperature displays are configured to indicate a state of the connected sensor, including whether the sensor is short-circuited, not connected, or broken.

15. The apparatus of claim 11, wherein the temperature displays are implemented as LED displays configured to display alphanumeric characters or diagnostic symbols.

16. The apparatus of claim 11, further comprising a charging socket configured to recharge a battery within the housing.

17. The apparatus of claim 16, wherein the charging socket comprises a Universal Serial Bus (USB) port connected to a battery charger module.

18. The apparatus of claim 11, wherein the housing is formed from at least one of metal, plastic, or alloy, and is shaped as a three-dimensional box.

19. The apparatus of claim 11, wherein the electronic components include a multi-thermometer-type circuit configured to process readings from the connected temperature sensors and output the processed data to the corresponding temperature displays.

* * * * *